US010198522B1

(12) United States Patent
Boyle et al.

(10) Patent No.: US 10,198,522 B1
(45) Date of Patent: Feb. 5, 2019

(54) INDEX OF NATIVE APPLICATION CONTENT INDEXABLE BY A SEARCH ENGINE

(71) Applicant: Joingo, LLC, San Jose, CA (US)

(72) Inventors: Stephen S. Boyle, Lincoln, CA (US); Russell S. Greer, Los Gatos, CA (US); Thang Dao, San Jose, CA (US); Ha Do, Milpitas, CA (US)

(73) Assignee: Joingo, LLC, Incline Village, NV (US)

( * ) Notice: Subject to any disclaimer, the term of this patent is extended or adjusted under 35 U.S.C. 154(b) by 495 days.

(21) Appl. No.: 14/684,414

(22) Filed: Apr. 12, 2015

(51) Int. Cl.
*G06F 17/30* (2006.01)
*G06F 17/00* (2006.01)
*H04M 1/725* (2006.01)
*H04M 1/247* (2006.01)

(52) U.S. Cl.
CPC .. *G06F 17/30876* (2013.01); *G06F 17/30867* (2013.01); *H04M 1/2473* (2013.01); *H04M 1/72522* (2013.01)

(58) Field of Classification Search
CPC .......... G06F 17/30899; G06F 17/3089; G06F 17/30867; G06F 17/30864; G06F 3/0482; G06F 3/0484; G06F 3/04842; G06F 11/3003; G06F 11/302; G06F 11/3037; G06F 11/3055; G06F 11/3089; G06F 11/3409; G06F 11/3419; G06F 11/3466; G06F 11/3495; G06F 17/03
See application file for complete search history.

(56) References Cited

U.S. PATENT DOCUMENTS

| | | | |
|---|---|---|---|
| 7,080,157 B2 * | 7/2006 | McCanne | H04L 12/1836 370/392 |
| 8,392,498 B2 | 3/2013 | Berg et al. | |
| 8,606,948 B2 | 12/2013 | Evans et al. | |
| 9,355,176 B2 * | 5/2016 | Hage | |
| 2013/0318207 A1 | 11/2013 | Dotter | |
| 2014/0059129 A1 | 2/2014 | Chumbley et al. | |
| 2014/0279997 A1 * | 9/2014 | Chiussi | G06F 17/30864 707/706 |
| 2014/0281863 A1 * | 9/2014 | Burckart | G06F 17/2235 715/208 |
| 2014/0351684 A1 * | 11/2014 | Smit | G06F 17/212 715/222 |

* cited by examiner

*Primary Examiner* — Yicun Wu

(74) *Attorney, Agent, or Firm* — Clause Eight IPS; Michael Catania

(57) ABSTRACT

A system and method for creating an index of native application content indexable by a search engine is disclosed herein. The system includes a content server, a web server, and a URL to native mobile application mapping database comprising a plurality of web content and a plurality of native mobile application content. The content server is configured to serve up the content as both a native mobile application and a web based application.

8 Claims, 8 Drawing Sheets

INDEX OF NATIVE APPLICATION CONTENT INDEXABLE BY A SEARCH ENGINE

CROSS REFERENCES TO RELATED APPLICATIONS

Not Applicable

STATEMENT REGARDING FEDERALLY SPONSORED RESEARCH OR DEVELOPMENT

Not Applicable

BACKGROUND OF THE INVENTION

Field of the Invention

The present invention generally relates to native mobile applications.

Description of the Related Art

Most people are familiar with using a search engine such as the GOOGLE search engine to search for terms on the Internet. The search engine is able to search for a term in a web page and generate a list of URLs that contain the search term. However, one cannot search native mobile applications in a similar manner.

One can search a database like the APP STORE from Apple Computer for native mobile applications.

The prior art discloses various methods for delivering content.

Berg et al., U.S. Pat. No. 8,392,498 discloses a method for delivering content and functionality to a number of different electronic devices.

Evans et al., U.S. Pat. No. 8,606,948 discloses a system for delivering cloud based content to devices.

Dotter, U.S. Patent Publication Number 20130318207 discloses a system for managing mobile application data.

Chumbley et al., U.S. Patent Publication Number 20140059129 discloses user specified user application data sharing.

General definitions for terms utilized in the pertinent art are set forth below.

APP is a software application for a mobile phone such as a smart phone.

Application Programming Interface (API) is a collection of computer software code, usually a set of class definitions, that can perform a set of related complex tasks, but has a limited set of controls that may be manipulated by other software-code entities. The set of controls is deliberately limited for the sake of clarity and ease of use, so that programmers do not have to work with the detail contained within the given API itself.

Beacon is a management frame that contains all of the information about a network. In a WLAN, Beacon frames are periodically transmitted to announce the presence of the network.

BLUETOOTH technology is a standard short range radio link that operates in the unlicensed 2.4 gigaHertz band.

Code Division Multiple Access ("CDMA") is a spread spectrum communication system used in second generation and third generation cellular networks, and is described in U.S. Pat. No. 4,901,307.

CRM (Customer Relationship Management) is a widely-implemented strategy for managing a company's interactions with customers, clients and sales prospects. CRM involves using technology to organize, automate, and synchronize business processes and the like—principally sales activities, but also business processes and the like for marketing, customer service and technical support.

DHCP (Dynamic Host Configuration Protocol) is a standard network protocol defined by RFC 1541 that allows a server to dynamically distribute IP addressing and configuration information, such as the subnet mask and the default gateway, to clients upon client requests.

Direct Inward Dialing ("DID") involves a carrier providing one or more trunk lines to a customer for connection to the customer's private branch exchange ("PBX") and a range of telephone lines are allocated to this line.

FTP or File Transfer Protocol is a protocol for moving files over the Internet from one computer to another.

GSM, Global System for Mobile Communications is a second generation digital cellular network.

Hypertext Transfer Protocol ("HTTP") is a set of conventions for controlling the transfer of information via the Internet from a web server computer to a client computer, and also from a client computer to a web server, and Hypertext Transfer Protocol Secure ("HTTPS") is a communications protocol for secure communication via a network from a web server computer to a client computer, and also from a client computer to a web server by at a minimum verifying the authenticity of a web site.

Internet is the worldwide, decentralized totality of server computers and data-transmission paths which can supply information to a connected and browser-equipped client computer, and can receive and forward information entered from the client computer.

Media Access Control (MAC) Address is a unique identifier assigned to the network interface by the manufacturer.

Organizationally Unique Identifier (OUI) is a 24-bit number that uniquely identifies a vendor, manufacturer, or organization on a worldwide basis. The OUI is used to help distinguish both physical devices and software, such as a network protocol, that belong to one entity from those that belong to another.

Probe Request: A frame that contains the advertisement IE for a device that is seeking to establish a connection with a proximate device.

Probe Response: A frame that contains the advertisement IE for a device. The Probe Response is sent in response to a Probe Request.

SSID (Service Set Identifier) is a 1 to 32 byte string that uniquely names a wireless local area network.

Transfer Control Protocol/Internet Protocol ("TCP/IP") is a protocol for moving files over the Internet.

URL or Uniform Resource Locator is an address on the World Wide Web.

User Interface or UI is the junction between a user and a computer program. An interface is a set of commands or menus through which a user communicates with a program. A command driven interface is one in which the user enter commands. A menu-driven interface is one in which the user selects command choices from various menus displayed on the screen.

Wayfinding is defined as tracking an object within a pre-determined space.

Web-Browser is a complex software program, resident in a client computer, that is capable of loading and displaying text and images and exhibiting behaviors as encoded in HTML (HyperText Markup Language) from the Internet, and also from the client computer's memory. Major browsers include MICROSOFT INTERNET EXPLORER, NETSCAPE, APPLE SAFARI, MOZILLA FIREFOX, and OPERA.

Web-crawling is searching web pages on the Internet using software robots (spiders) to collect information for a search engine program.

Web page is a simple text file with HTML tags that instruct a web browser how the web page should look when viewed in the browser.

Web-Server is a computer able to simultaneously manage many Internet information-exchange processes at the same time. Normally, server computers are more powerful than client computers, and are administratively and/or geographically centralized. An interactive-form information-collection process generally is controlled from a server computer, to which the sponsor of the process has access.

Wireless Application Protocol ("WAP") is an open, global specification that empowers users with mobile wireless communication devices (such as mobile phones) to easily access data and to interact with Websites over the Internet through such mobile wireless communication device. WAP works with most wireless communication networks such as CDPD, CDMA, GSM, PDC, PHS, TDMA, FLEX, reflex, iDEN, TETRA, DECT, DataTAC, Mobitex and GRPS. WAP can be built on most operating systems including PalmOS, WINDOWS, CE, FLEXOS, OS/9, JavaOS and others.

WAP Push is defined as an encoded WAP content message delivered (pushed) to a mobile communication device which includes a link to a WAP address.

Wireless AP (access point) is a node on the wireless local area network (WLAN) that allows wireless devices to connect to a wired network using Wi-Fi, or related standards.

There is a need for searching mobile applications.

BRIEF SUMMARY OF THE INVENTION

The present invention provides a method and system for searching native mobile applications.

One aspect of the present invention is a system for creating an index of native application content indexable by a search engine. The system includes a content server, a web server, and a URL to native mobile application mapping database comprising a plurality of web content and a plurality of native mobile application content. The content server is configured to serve up the content as both a native mobile application and a web based application. Each web content of the plurality of web content is mapped to a corresponding native application content of the plurality of native application content. The web server is configured to be indexed by a search engine program to access the web content and create a searchable index of URLs of each of the plurality of web content. Selecting a URL from the searchable index of URLs on a device with native application availability results in starting the native mobile application and advancing to a screen location corresponding with the selected URL from the searchable index of the content through use of the mapping database.

Another aspect of the present invention is a method for creating an index of native application content searchable by a search engine. The method includes mapping of each web content of a plurality of web content to a corresponding native application content of a plurality of native application content in a URL to screen mapping database. The method also includes creating a searchable index of URLs of each of the plurality of web content in the URL to screen mapping database using a search engine program to engage a web server to access the plurality of web based application content. The method also includes receiving at the web server a request for a selected URL of the plurality of web content from a requesting device. The method also includes transmitting a transmission of the web based content of a selected URL with a scriptlet in the beginning of the transmission, the scriptlet configured to test for a native mobile application available on the requesting device.

Having briefly described the present invention, the above and further objects, features and advantages thereof will be recognized by those skilled in the pertinent art from the following detailed description of the invention when taken in conjunction with the accompanying drawings.

DETAILED DESCRIPTION OF THE INVENTION

Figure 1:
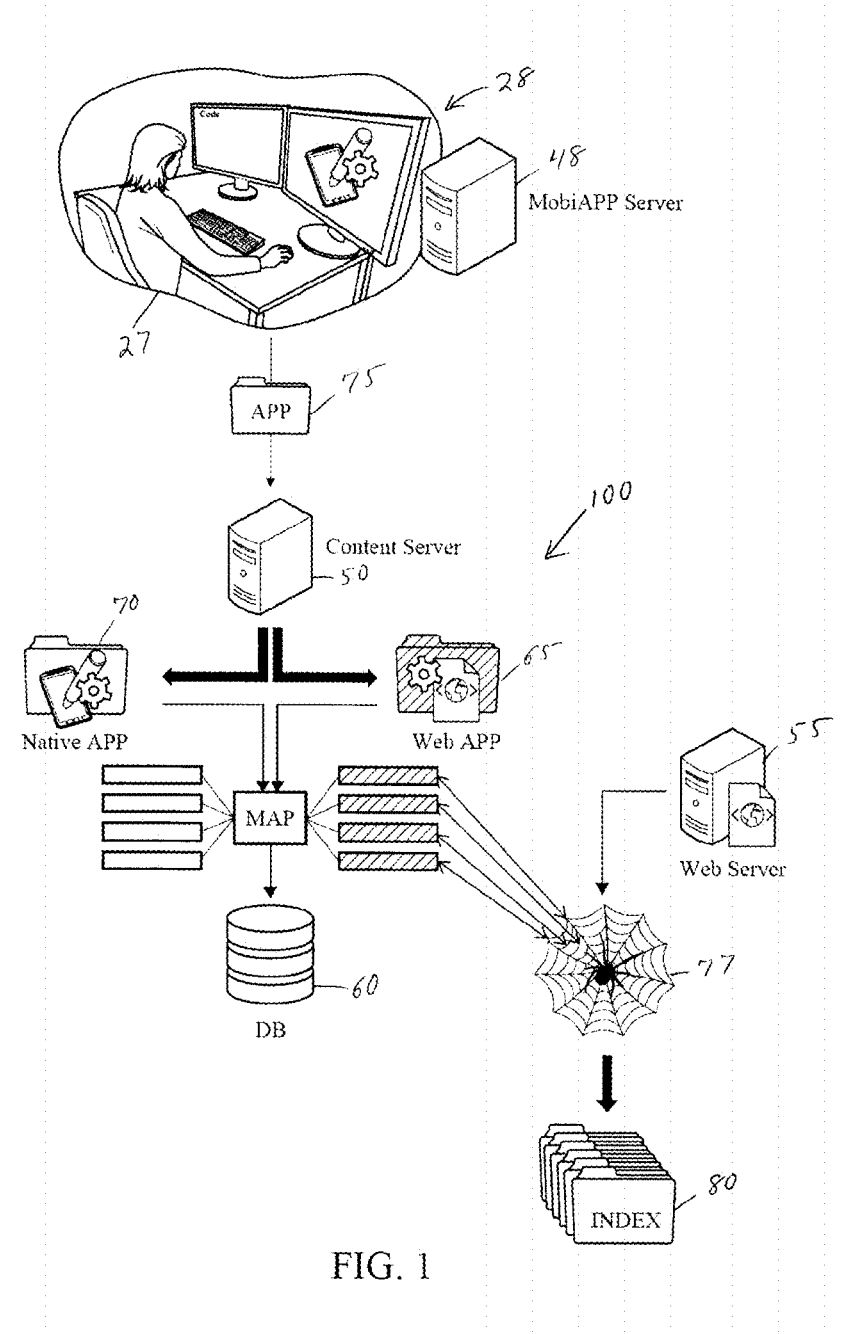
FIG. 1 is an illustration of a system for creating an index of native application content indexable by a search engine.
Figure 2:
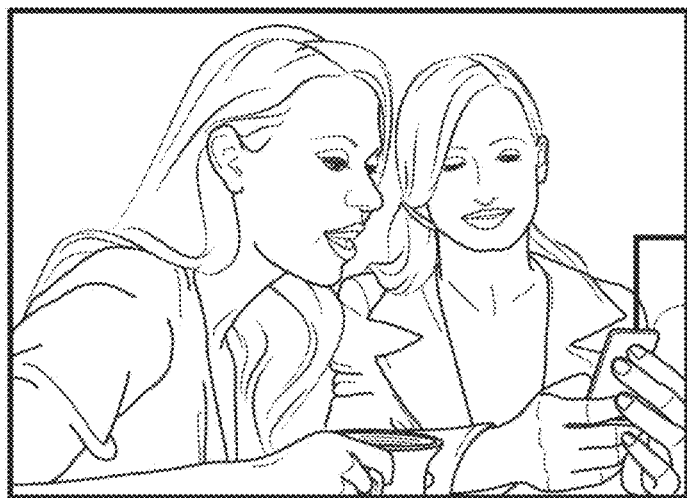
FIG. 2 is an illustration of end-users sharing content from a mobile communication device.
Figure 2A:
FIG. 2A is a view of a display screen of a mobile communication device.
Figure 3:
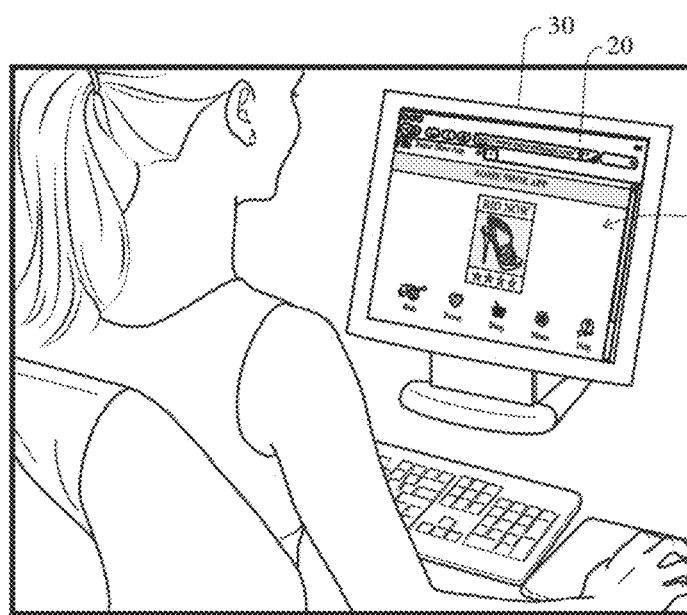
FIG. 3 is an illustration of an end user receiving content on a desktop computer using a web browser.
Figure 3A:
FIG. 3A is an illustration of a web-page on a screen of the desktop computer of FIG. 3.
Figure 4:
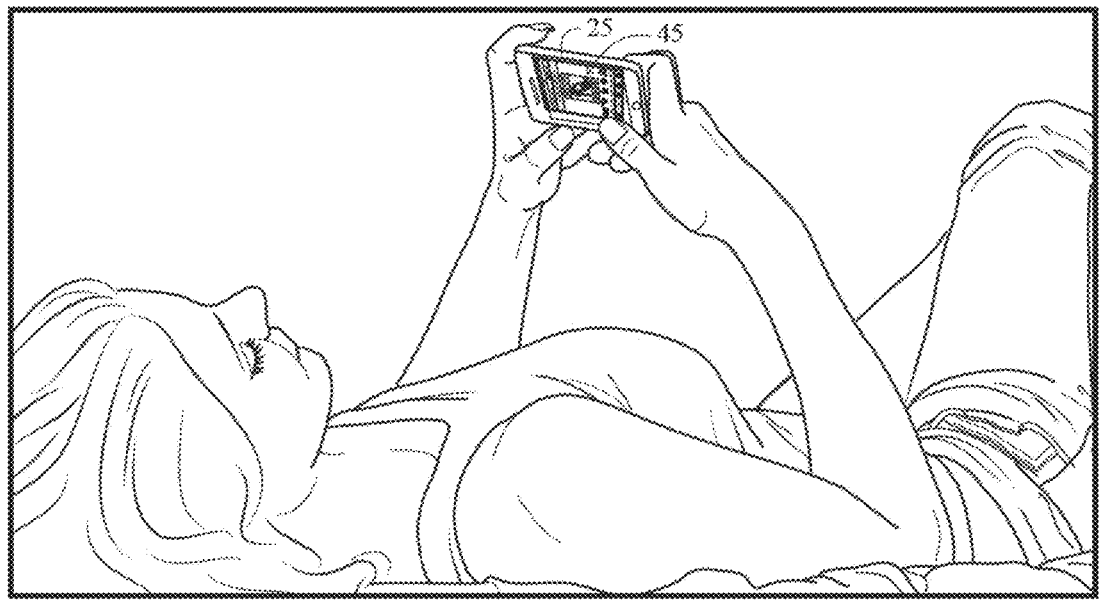
FIG. 4 is an illustration of an end-user viewing content on a mobile web browser of a mobile communication device.
Figure 4A:
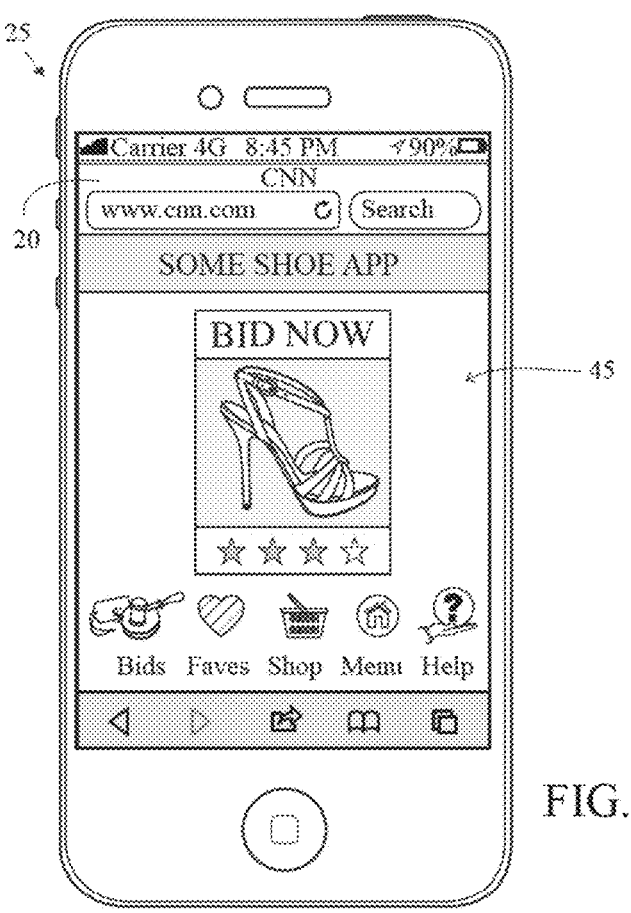
FIG. 4A is a view of a display screen of a mobile communication device showing web content on a mobile web browser.
Figure 5:
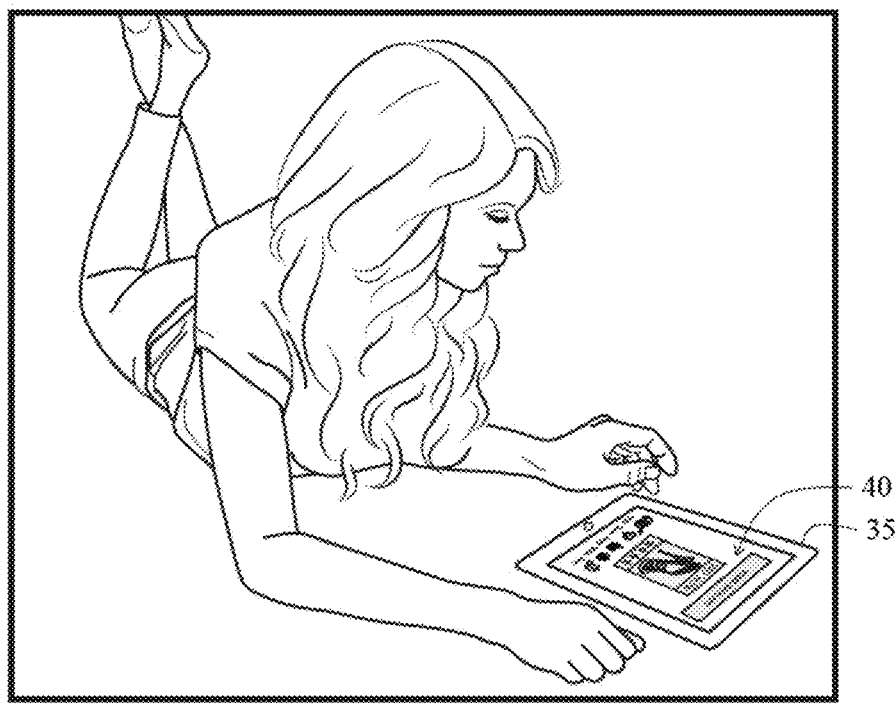
FIG. 5 is an illustration of an end user receiving content on a tablet computer in the form of a native mobile application.
Figure 5A:
FIG. 5A is an illustration of a native mobile application on a screen of the tablet computer of FIG. 5.

A system 100 for creating an index of native application content indexable by a search engine is shown in FIG. 1. The system 100 preferably includes a content server 50, a web server 55, and a URL to native mobile application mapping database 60 comprising web content 65 and native mobile application content 70. The content server 50 is preferably configured to serve up the content as both a native mobile application and a web based application. Each web content 65 is mapped to a corresponding native application content 70, preferably at the content server 50. The web server 55 is preferably configured to be indexed by a search engine program 77 to access the web content and create a searchable index 80 of URLs of each content of the web content 65. Selecting a URL from the searchable index 80 of URLs on a device 25 with native application availability results in starting the native mobile application 75 and advancing to a screen location corresponding with the selected URL from the searchable index 80 of the content through use of the mapping database 60.

As shown in FIG. 1, an app developer 27 working in a content management system development environment 28, generates a native mobile application 75 using a mobile application server 48. The developer 27 preferably uses a SDK (software development kit) to generate the native mobile application 75. The app developer opens a content management system development environment for building mobile application content. The app developer builds a mobile application content in the content management system development environment 28. The mobile application content has a content management format. The app developer saves the mobile application content at the content server 65. The mobile application content is preferably a mobile gaming application for a blackjack, slots or poker game.

The iPHONE® mobile phone from Apple, Inc., of Cupertino, Calif. has an iOS platform. An app developer wishing to develop a mobile application for an iPHONE® mobile phone must create the mobile application using an iOS platform. An app developer needs a MACINTOSH® computer running SNOW LEOPARD™ operating system. The app developer also needs to become a registered IOS developer before being able to download the iOS software development kit ("SDK"). The app developer also needs to download the XCODE™ integrated development environment ("IDE"). The app developer will also use the COCOA TOUCH application environment. Also, the mobile app must be certified by Apple.

If the app developer wishes to have the mobile application available for an ANDROID® phone, then the app developer must create a new mobile application using an ANDROID operating platform. The app developer will need a JAVA® development kit ("JDK"), ECLIPSE™ IDE, the ANDROID® SDK, and the ANDROID development tools plug-in.

If the app developer wishes to have the mobile application available for a WINDOWS® phone, then the app developer must create a new mobile application using a WINDOWS® operating platform. The app developer will need WINDOWS phone developer tools, and the app developer will work with the SILVERLIGHT framework or the XNA Framework of the WINDOWS® phone application platform. Also, the mobile app must be certified by Microsoft.

The mobile communication devices 25 utilized with the present invention preferably include mobile phones, smartphones, tablet computers, PDAs and the like. Examples of smartphones and the device vendors include the IPHONE® smartphone from Apple, Inc., the DROID® smartphone from Motorola Mobility Inc., GALAXY S® smartphones from Samsung Electronics Co., Ltd., and many more. Examples of tablet computing devices include the IPAD® tablet from Apple Inc., and the XOOM™ tablet from Motorola Mobility Inc.

A mobile communication service provider (aka phone carrier) of the customer such as VERIZON, AT&T, SPRINT, T-MOBILE, and the like mobile communication service providers, provide the communication network for communication to the mobile communication device of the end user.

Wireless standards include 802.11a, 802.11b, 802.11g, AX.25, 3G, CDPD, CDMA, GSM, GPRS, radio, microwave, laser, Bluetooth, 802.15, 802.16, and IrDA.

The content server 50 includes a CPU component, a graphics component, PCI/PCI Express, RAM memory, non-removable storage, removable storage, Network Interface, including one or more connections to a fixed network, and a SQL database. Included in the memory, are the operating system, the SQL server, and computer programs. The content server 50 also includes at least one computer program configured to receive data uploads and store the data uploads in the SQL database. The SQL server preferably comprises of other components of SQL server that can be installed separately from the SQL database engine.

Each of the interface descriptions preferably discloses use of at least one communication protocol to establish handshaking or bi-directional communications. These protocols preferably include but are not limited to XML, HTTP, TCP/IP, Serial, UDP, FTP, Web Services, WAP, SMTP, SMPP, DTS, Stored Procedures, Import/Export, Global Positioning Triangulation, IM, SMS, MMS, GPRS and Flash. The databases used with the system preferably include but are not limited to MSSQL, Access, MySQL, Progress, Oracle, DB2, Open Source DBs and others. Operating system used with the system preferably include Microsoft 2010, XP, Vista, 200o Server, 2003 Server, 2008 Server, Windows Mobile, Linux, Android, Unix, I series, AS 400 and Apple OS.

The underlying protocol at a server, is preferably Internet Protocol Suite (Transfer Control Protocol/Internet Protocol ("TCP/IP")), and the transmission protocol to receive a file is preferably a file transfer protocol ("FTP"), Hypertext Transfer Protocol ("HTTP"), Secure Hypertext Transfer Protocol ("HTTPS") or other similar protocols. The transmission protocol ranges from SIP to MGCP to FTP and beyond. The protocol at the server is preferably HTTPS.

A typical mobile communication device 25 includes an accelerometer, a headphone jack, a microphone jack, a speaker, a GPS chipset, a Bluetooth component, a Wi-Fi component, a 3G/4G component, a Baseband Processor (for radio control), an applications processor, a JTAG (debugger), a SDRAM memory, a Flash memory, SIM card, LCD display, a camera, a power management circuit and a battery or power source.

The web browsers utilized preferably are INTERNET EXPLORER, MOZILLA FIREFOX, APPLE SAFARI and GOOGLE CHROME.

As shown in FIGS. 2, 2A, 3 and 3A, a first end user using a mobile device 25 uploads the content 40 in the form of a native mobile application. The end user distributes content from the mobile device 25 to other end users. One other end user shown in FIG. 3, views the content as a web content (web page) 45 on a screen 20 of a desktop computer 30. The other end user receives the content at the desktop computer 30 in the context, layout, and format expected for a desktop computer, independent of the device of the original end user. The content is shared from a native mobile application to a web application for a desktop computer.

As shown in FIGS. 4, 4A, 5 and 5A, a first end user using a mobile device 25 uploads the content 45 on a mobile browser in the form of a web content 45. The end user distributes content from the mobile device 25 to other end users. One other end user shown in FIG. 5, views the content as a native mobile application 40 on a screen 20 of a tablet computer 35. The other end user receives the content at the tablet computer 35 in the context, layout, and format expected for a tablet computer, independent of the device of the original end user. The content is shared from a web content 45 to a native mobile application 40 for a tablet computer.

FIGS. 7, 8, 9 and 10 illustrate how the same content is viewed in the context, layout, and format expected for a mobile phone 25, a tablet computer 35, a desktop computer 30 and a mobile browser of a mobile phone 25, independent of the device of the original end user.

Figure 11:
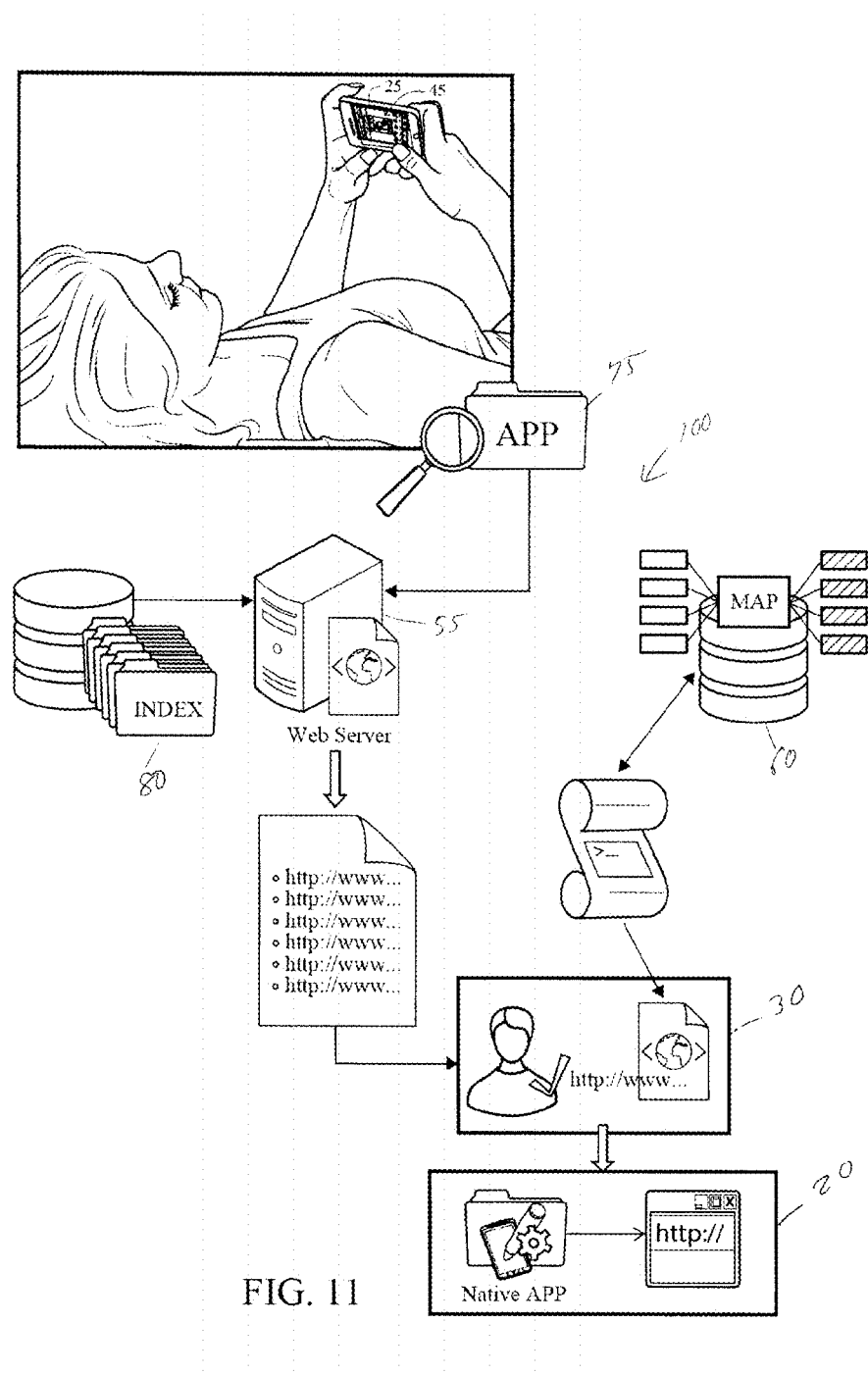
FIG. 11 is a block diagram of a sharing content using a system for creating an index of native application content indexable by a search engine.

FIG. 11 illustrates the process for sharing the content from one end user to another regardless of the device of the original end user and the devices of the other end users. In FIG. 11, an end user is viewing content on a mobile phone 25. The end user wants to share the content with others. The content server is configured to serve up the content to both a Native mobile application and a web based application. The mapping database 60 is loaded with a mapping of web content 65 to native mobile application content 70. The web server 55 is configured to be engaged by a search engine spider such as the GOOGLE search engine. The GOOGLE indexing system grovels over the web content 65 and creates a searchable index 80 of the content. The end user searches the index and is given a list of hits. Once a hit is selected, the web based content 65 is searched up with a scriptlet in the beginning configured to test for a native mobile application available on the receiving device. If a native mobile application is available on the receiving device, the native mobile application is started and is then advanced to the screen location corresponding with the selected URL from the search engine results through use of the mapping database 60. When an end user shares a piece of content from a mobile device 25, all of the other end-users who view that content get the content in the context, layout, and format expected for the other end-users' devices, independent of the device the content was shared from and the devices the content was viewed on by the other end-users. Content shared form a native mobile application can be viewed on a desktop computer as a web application. Content shared from a native mobile application can be viewed on another mobile phone as a web application in a mobile browser. Content shared from a native mobile application can be viewed on another mobile phone as a native mobile application. Content shared from a desktop computer can be viewed on a mobile phone as a native mobile application.

Figure 6:
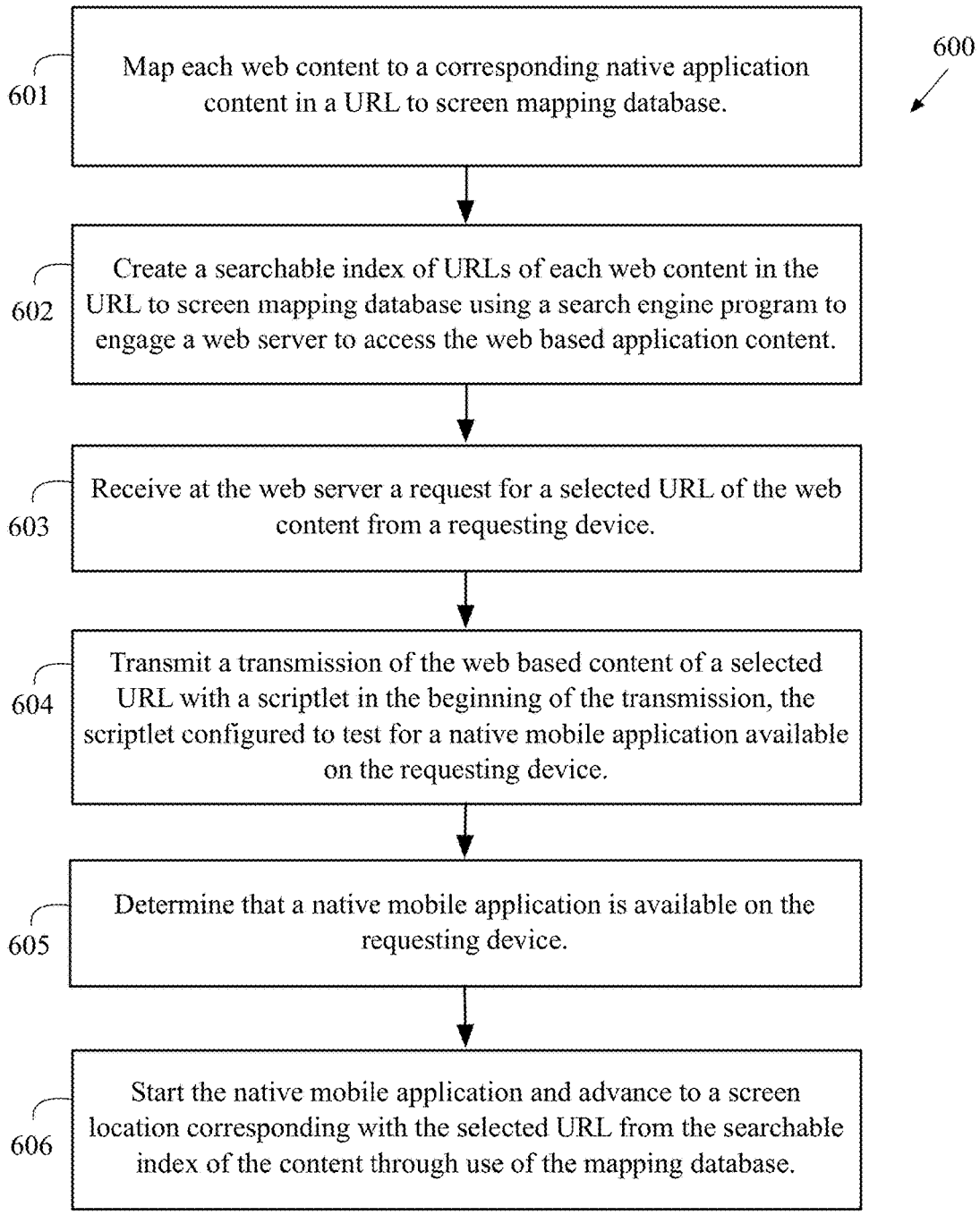
FIG. 6 is a flow chart of a method for creating an index of native application content indexable by a search engine.
Figure 7:
FIG. 7 is a view of a display screen of a mobile communication device showing content in the form of a native mobile application.
Figure 8:
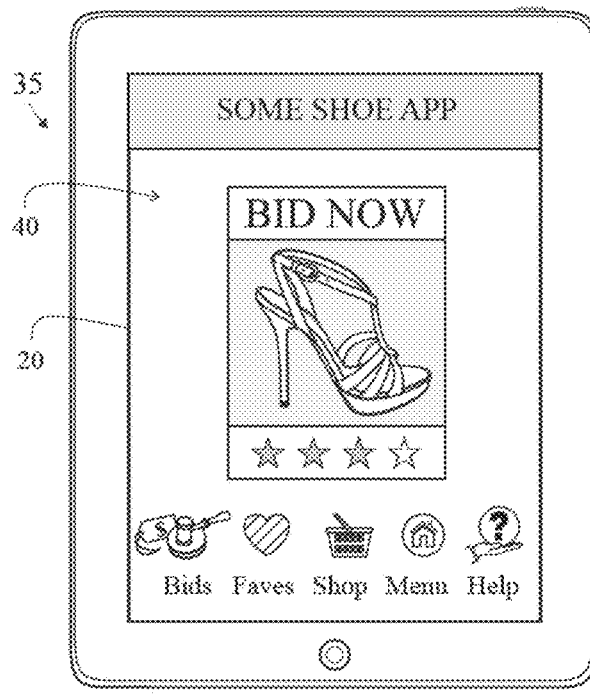
FIG. 8 is an illustration of a display screen of the tablet computer showing content in the form of a native mobile application.
Figure 9:
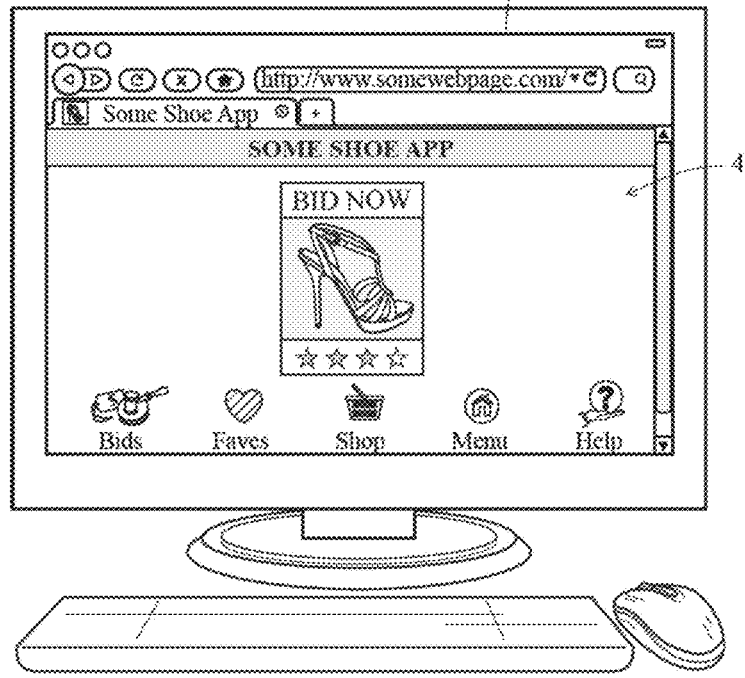
FIG. 9 is an illustration of a display screen of the desktop computer showing content in the form of a web application.
Figure 10:
FIG. 10 is an illustration of a display screen of a mobile communication device showing content in the form of a web application.

A flow chart for a method 600 for creating an index of native application content searchable by a search engine is shown in FIG. 6. At block 601, each web content 65 of a plurality of web content is mapped to a corresponding native application content 70 of a plurality of native application content in a URL to screen mapping database 60. At block 602, a searchable index of URLs of each of the plurality of web content is created in the URL to screen mapping database 50 using a search engine program 77 to engage a web server 55 to access the plurality of web based application content 65. At block 603, the web server 55 receives a request for a selected URL of the plurality of web content from a requesting device 25. At block 604, a transmission of the web based content 65 of a selected URL is transmitted with a scriptlet in the beginning of the transmission. The scriptlet is configured to test for a native mobile application available on the requesting device 25. An example of a scriptlet code is disclosed in Boyle et al., U.S. patent application Ser. No. 14/606,211, for a Method And System For Including Content In A WiFi Stream, filed on Jan. 27, 2015, which is hereby incorporated by reference in its entirety. At block 605, the requesting device 25 determines that a native mobile application is available for the web based content. At block 606, the native mobile application 75 is started and advanced to a screen location corresponding with a selected URL from the searchable-index of the content through use of the mapping database 60.

The present invention may be utilized with a marketing system such as disclosed in Boyle et al., U.S. Pat. No. 8,433,342, for a Method And System For Personalized Venue Marketing, which is hereby incorporated by reference its entirety. The present invention may be utilized with a gaming system such as disclosed in Boyle, U.S. Pat. No. 8,771,063 for a System And Method For Managing Games In A Mobile Virtual Casino, which is hereby incorporated by reference its entirety. The present invention may be utilized with a gaming system such as disclosed in Boyle, U.S. patent application Ser. No. 13/756,591, filed on Jan. 31, 2013, for a System And Method For Virtual Currency In A Virtual Casino, which is hereby incorporated by reference its entirety. The present invention may be utilized with a gaming system such as disclosed in Boyle, U.S. Pat. No. 8,944,910, for a System And Method For Secure Play In A Mobile Virtual Casino, which is hereby incorporated by reference its entirety. The method and system of the present invention may be utilized with an anonymous loyalty program such as described in Boyle, U.S. Pat. No. 8,463,645, for an Anonymous Rewards Club Program, which is hereby incorporated by reference in its entirety. The method and system of the present invention may be utilized with the system described in Boyle et al., U.S. Pat. No. 8,693,403, for a Method And System For Detection And Correction of Wi-Fi Login Failure, which is hereby incorporated by reference in its entirety. The method and system of the present invention may be utilized with the system described in Greer et al., U.S. Pat. No. 8,959,656, for an Segmented Architecture Method And System, which is hereby incorporated by reference in its entirety. The method and system of the present invention may be utilized with the system described in Boyle, U.S. patent application Ser. No. 13/844,585 filed on Mar. 15, 2013, for a Method And System For Freemium WiFi Service, which is hereby incorporated by reference in its entirety. The method and system of the present invention may be utilized with the system described in Boyle, U.S. patent application Ser. No. 13/843,627 filed on Mar. 15, 2013, for a Method And System For Incentivizing On-Site Participation In Games And Offers which is hereby incorporated by reference in its entirety. The method and system of the present invention may be utilized with the system described in Boyle, U.S. Pat. No. 8,583,777, for a Method And System For Providing Real-Time End-User WiFi Quality Data, which is hereby incorporated by reference in its entirety. The method and system of the present invention may be utilized with the system described in Boyle, U.S. Pat. No. 8,738,036, for a Method And System For Wayfinding At A Venue, which is hereby incorporated by reference in its entirety. The method and system of the present invention may be utilized with the system described in Boyle, U.S. Pat. No. 8,725,170, for a System And Method For Measuring The Quantity, Type And Transmission Quality Of Mobile Communication Devices Within A Defined Geographical Area, which is hereby incorporated by reference in its entirety.

From the foregoing it is believed that those skilled in the pertinent art will recognize the meritorious advancement of this invention and will readily understand that while the present invention has been described in association with a preferred embodiment thereof, and other embodiments illustrated in the accompanying drawings, numerous changes modification and substitutions of equivalents may be made therein without departing from the spirit and scope of this

We claim as our invention:

1. A method for linking native application content to corresponding web content for searching by a search engine, the method comprising:
   identifying each web content of a plurality of web application content to a corresponding native mobile application content of a plurality of native mobile application content, wherein the native mobile application content is generated in a content management system development environment;
   linking each web content of the plurality of web application content to the corresponding native mobile application content of the plurality of native mobile application content in a URL to screen mapping database;
   creating a searchable index of URLs of each of the plurality of web content in the URL to screen mapping database using a search engine program to engage a web server to access the plurality of web application content;
   receiving at the web server a request for a selected URL of the plurality of web application content from a requesting mobile device;
   transmitting a transmission of the web based content of a selected URL with a scriptlet in the beginning of the transmission, the scriptlet configured to test for a native mobile application available on the requesting mobile device; and
   determining that a native mobile application is available on the requesting device; and
   starting the native mobile application on the requesting mobile device and advancing to a screen location corresponding with the selected URL from the searchable index of the content through use of the mapping database;
   wherein the native mobile application content is native for an operating system for a mobile device since the native mobile application is generated using the operating system of the mobile device;
   wherein the method provides for sharing a content from a mobile app and viewing the content on a mobile web, sharing a content from a mobile app and viewing the content on a mobile app, and sharing a content from a mobile app and viewing the content on a desktop web;
   wherein a searchable index of URLs of each of the plurality of web content in the URL to screen mapping database provides for searching of native mobile application content.

2. The method according to claim 1 wherein the same content is viewed in the context, layout and format for a requesting device.

3. A system for linking native application content to corresponding web content for searching by a search engine, the system comprising:
   a content server;
   a web server;
   a URL to native mobile application mapping database comprising a plurality of web content and a plurality of native mobile application content;
   wherein the content server is configured to serve up the content as both a native mobile application and a web based application;
   wherein in the URL to native mobile application mapping database, each web content of the plurality of web content is linked to a corresponding native mobile application content of the plurality of native mobile application content;
   wherein the mobile device is configured to receive a web based content of a selected URL with a scriptlet in the beginning of the transmission, the scriptlet configured to test for a native mobile application available on the requesting mobile device;
   wherein the web server is configured to be indexed by a search engine program to access the web content and create a searchable index of URLs of each of the plurality of web content;
   wherein selecting a URL from the searchable index of URLs on a device with native application availability results in starting the native mobile application and advancing to a screen location corresponding with the selected URL from the searchable index of the content through use of the mapping database;
   wherein the native mobile application is native for an operating system for a mobile device since the native mobile application is generated using the operating system.

4. The system according to claim 3 wherein an original end user distributing content from a mobile device to a plurality of other end users viewing the content receive the content in the context, layout, and format expected independent of the device of the original end user and each device of the plurality of other end users.

5. The system according to claim 4 wherein the content is shared from a mobile app and viewed on a desktop web.

6. The system according to claim 4 wherein the content is shared from a mobile app and viewed on a mobile web.

7. The system according to claim 4 wherein the content is shared from a mobile app and viewed on a mobile app.

8. The system according to claim 4 wherein the content is shared from a desktop web and viewed on a mobile app.

* * * * *